United States Patent [19]

Lindner et al.

[11] Patent Number: 5,171,786
[45] Date of Patent: Dec. 15, 1992

[54] PVC-SILICONE RUBBER MOLDING COMPOUNDS SHOWING TOUGHNESS AT LOW TEMPERATURES

[75] Inventors: Christian Lindner, Cologne; Volker Damrath, Burscheid; Karl-Erwin Piejko, Bergisch Gladbach; Karl-Heinz Ott, Leverkusen, all of Fed. Rep. of Germany

[73] Assignee: Bayer Aktiengesellschaft, Leverkusen, Fed. Rep. of Germany

[21] Appl. No.: 370,849

[22] Filed: Jun. 23, 1989

[30] Foreign Application Priority Data

Jul. 5, 1988 [DE] Fed. Rep. of Germany ....... 3822667

[51] Int. Cl.$^5$ .............................................. C08G 63/48
[52] U.S. Cl. ..................................... 525/63; 428/420; 525/104
[58] Field of Search .................... 525/63, 104; 428/420

[56] References Cited

U.S. PATENT DOCUMENTS 4,865,917  9/1989  Lindner et al. ...................... 525/63
4,885,209 12/1989  Lindner et al. ..................... 428/420

Primary Examiner—Melvyn I. Marquis
Attorney, Agent, or Firm—Connolly & Hutz

[57] ABSTRACT

The invention relates to thermoplastic PVC molding compounds containing specially synthesized silicone graft rubbers. These thermoplastic molding compounds show an excellent combination of properties such as impact strength at room temperature, impact strength at low temperatures and particularly high resistance to ageing under the effect of light, moisture and heat.

4 Claims, No Drawings

PVC-SILICONE RUBBER MOLDING COMPOUNDS SHOWING TOUGHNESS AT LOW TEMPERATURES

This invention relates to thermoplastic PVC molding compounds containing specially synthesized silicone graft rubbers. These thermoplastic molding compounds show an excellent combination of properties, such as impact strength at room temperature, impact strength at low temperatures and particularly good resistance to ageing under the effect of light, moisture and heat.

It is known that the impact strength and heat resistance of polyvinyl chloride (PVC) are improved by addition of graft rubbers. Accordingly, polyvinyl chloride is suitable for blending with ABS and MBS graft polymers (diene rubber graft polymers) or graft polymers based on alkylacrylate rubbers, ethylene-vinylacetate copolymer rubbers or ethylene-propylene copolymer rubbers. However, the ageing resistance (weather resistance) of such mixtures may be inadequate. The graft rubber polymers mentioned may show unsatisfactory toughness at low temperatures.

Silicone graft rubbers showing particularly good low-temperature behavior are known per se. They may only be incorporated to a limited extent as a modifying component in PVC molding compounds because it is known that PVC molding compounds of high toughness, high rigidity and high heat resistance are difficult to produce by blending with silicone graft rubbers.

It has now been found that particulate silicone graft rubbers may be used as suitable modifiers for PVC providing the particulate silicone rubber component of the graft polymers is coated with suitable quantities of a crosslinking alkylacrylate rubber and/or certain quantities of the alkylacrylate rubber are concentrated on and fixed to the silicone rubber particles before resin-forming vinyl monomers are grafted onto the rubber particles.

The molding compounds according to the invention show favorable properties, such as high heat resistance, high toughness at low temperatures, high processing stability, and give moldings of high surface quality. They may be processed in particularly economical processing cycle times.

Accordingly, the present invention relates to thermoplastic molding compounds of polyvinyl chloride and a particulate graft polymer of (a) a core of a crosslinked silicone rubber, (b) a first (inner) shell of a crosslinked acrylate rubber and (c) a second (outer) shell of a polymer or copolymer of resin-forming monomers.

Thermoplastic molding compounds in which the ratio by weight of (a) to (b) is from 90:10 to 40:60 are preferred.

The graft polymers have an average particle size ($d_{50}$) of from 0.08 to 0.6 μm (diameter).

The resin polymer of the shell (c) is a polymer or copolymer of monomers from the group consisting of styrene, acrylonitrile, α-methylstyrene, alkylmethacrylate, alkylacrylate.

The material of the core (a) is a crosslinked silicone rubber and contains units corresponding to formulae (Ia–Id).

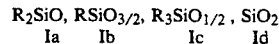

$$R_2SiO, \quad RSiO_{3/2}, \quad R_3SiO_{1/2}, \quad SiO_2$$
$$\text{Ia} \qquad \text{Ib} \qquad \text{Ic} \qquad \text{Id}$$

in which R is a monofunctional organic radical containing from 1 to 18 C atoms.

From 0 to 10 mol units corresponding to the formula $RSiO_{3/2}$, from 0 to 1.5 mol units corresponding to the formula $R_3SiO_{\frac{1}{2}}$ and/or from 0 to 3 mol units corresponding to the formula $SiO_2$ are used per 100 mol siloxane units corresponding to the formula $R_2SiO$.

R may be a monofunctional, saturated hydrocarbon radical containing 1 to 18 carbon atoms, preferably methyl, ethyl, a $C_{6-24}$ aryl radical, preferably a phenyl radical, a $C_{1-10}$ alkoxy radical or a vinyl or γ-mercaptopropyl radical. At least 80% of all the radicals R are preferably methyl radicals. Combinations of methyl and ethyl radicals in formulae Ia to Id are particularly preferred.

The inner shell (b) is a crosslinked acrylate rubber. It is preferably a crosslinked polymer of alkylacrylates, optionally in admixture with up to 40% by weight of other vinyl monomers. Suitable polymerizable acrylates, are, for example, optionally substituted $C_{1-8}$ alkyl esters, such as methyl, ethyl, butyl, octyl and 2-ethylhexyl ester, haloalkyl esters, preferably $C_{1-8}$ haloalkyl esters, such as chloroethyl acrylate. They may be used individually or in admixture. At least one unsubstituted alkyl ester is preferably present in the mixture. They may be crosslinked by addition of polyfunctional monomers during the copolymerization, for example by the addition of esters of unsaturated carboxylic acids with a polyol (preferably containing 2 to 20 carbon atoms in the ester group), such as ethylene glycol dimethacrylate, esters of a polybasic carboxylic acid with an unsaturated alcohol (preferably 8 to 30 carbon atoms in the ester group), such as triallyl cyanurate, triallyl isocyanurate; divinyl compounds, such as divinylbenzene; esters of unsaturated carboxylic acids with unsaturated alcohols (preferably 6 to 12 carbon atoms in the ester group), such as allylmethacrylate; phosphoric acid esters, for example triallyl phosphate and 1,3,5-triacryloyl hexahydro-s-triazine. Particularly preferred polyfunctional monomers are triallyl cyanurate, triallyl isocyanurate, triallyl phosphate, allyl methacrylate From 0.05 to 5.0% by weight polyfunctional monomers, based on the weight of the first inner shell (b), are preferably used for crosslinking. The elastomer of the shell (b) may additionally contain one or more copolymerizable monomers of the vinyl or vinylidene type in copolymerized form, for example methylmethacrylate, butylmethacrylate, acrylonitrile, styrene, α-methylstyrene, acrylamides, vinylalkyl ethers. These comonomers may be copolymerized in quantities of up to 40% by weight, based on the weight of polymer (b).

The second, outer shell (c) is a graft-polymerized polymer of resin-forming α,β-unsaturated, radically polymerizable monomers, preferably from the group consisting of o-methylstyrene, styrene, p-methylstyrene, halostyrene, acrylonitrile, methacrylonitrile, alkylmethacrylates containing 1 to 8 C atoms in the alcohol part, maleic acid derivatives, particularly maleic imides, vinyl acetate, vinyl chloride, vinylidene fluoride. Copolymers of at least two monomers from the group consisting of styrene, α-methylstyrene, acrylonitrile, alkylmethacrylate and alkylacrylate are particularly preferred.

The graft polymers suitable for use in accordance with the invention may be prepared as follows:

An emulsion of the core material (a) is prepared in a first step:

The preparation of an emulsion of a long-chain, OH-terminated silicone oil by emulsion polymerization is known (cf. for example US-P 2,891,910, GB-p 1,024,024). According to the British patent, it is preferred to use an alkylbenzenesulfonic acid which may be both an emulsifier and a polymerization catalyst in one. After polymerization, the acid is neutralized. The concentration of emulsifier may be kept low. Instead of the alkylbenezenesulfonic acids mentioned, it is also possible to use n-alkylsulfonic acids. In addition to the catalytically active sulfonic acid, it is also possible to use other emulsifiers as co-emulsifiers.

Nonionic or anionic co-emulsifiers may be added. Particularly suitable anionic co-emulsifiers are, for example, salts of the n-alkyl or alkylbenzenesulfonic acids mentioned above. Nonionic co-emulsifiers are, for example, polyoxyethylene derivatives of fatty alcohols, fatty acids and the like. Examples of emulsifiers such as these are POE (3) lauryl alcohol (POE=polyoxyethylene (x) with x=degree of polymerization), POE (2) oleyl alcohol, POE (7) nonylphenol or POE (10) stearate. The notation POE (3) lauryl alcohol means that 3 units ethylene oxide have been added onto 1 molecule lauryl alcohol, the FIG. 3 representing an average value.

Silicone oils which have been prepared by emulsion polymerization in the presence of nonionic co-emulsifiers may have a lower molecular weight than those which have been produced without a co-emulsifier. The molecular weight of the OH-terminated silicone oil produced by emulsion polymerization may be controlled, for example, through the production temperature (cf. for example J. Polymer Sci. Part C, 27, pages 27–34 (1969)).

The additional groups mentioned above may be incorporated in the silicone polymer by reaction in the presence of suitable substituted siloxane oligomers. Suitable starting oligomers are, for example, tetramethyl tetravinyl cyclotetrasiloxane or γ-mercaptopropymethyl dimethoxysilane or its hydrolyzate.

These functional oligomers may be added to the basic oligomer in the desired quantities for copolymerization.

Relatively long-chain alkyl radicals R, such as for example ethyl, propyl, and phenyl groups may also be similarly incorporated.

The silicone graft base should be partly crosslinked, for example, by crosslinking silanes or vinyl and SH groups.

Silicone graft bases having gel contents greater than 75% by weight, as measured in toluene at room temperature, are preferred. The gel content may serve as a measure of the degree of crosslinking.

Branches or crosslinks may be incorporated by addition of, for example, tetraethoxysilane or a silane corresponding to formula (II)

$$RSiX_3 \qquad (ii)$$

in which

X represents a hydrolyzable group, such as a $C_{1-10}$ alkoxy radical and

R has the meanings defined for formula I, preferably methyl, phenyl.

Tetraethoxysilane, methyl trimethoxysilane or phenyl trimethoxysilane are particularly preferred.

In the second step of the process according to the invention, the acrylate rubber for the first shell (b) is prepared by emulsion polymerization in the presence of the silicone rubber latex of the first step. The monomers (principal constituent at least one acrylate) are emulsified in the latex and polymerized in known manner onto radical-forming initiators. The acrylate rubber polymerizes onto the silicone rubber. It is crosslinked by the use of polyfunctional monomers during its production.

In this graft polymerization of the first shell (b), the formation of new particles should preferably be completely suppressed. This can be achieved, for example, by the presence of an emulsion stabilizer in a quantity sufficient to cover the surface of the particles. The size of these particles may be varied within wide limits through the conduct of the reaction. Where an agglomerated latex for example is used as the core (a) to obtain large particles, these large particles may contain several silicone rubber particles.

On completion of the graft polymerization of the acrylate rubber, a vinyl monomer or a mixture of vinyl monomers is polymerized in emulsion onto the latex obtained. The graft polymers according to the invention are formed during this emulsion polymerization with formation of the second shell (c). During this graft polymerization known per se, which may be carried out, for example, in the presence of radical initiators, for example water-soluble initiators, emulsifiers or complexing agents, graft activators and regulators, free polymers or copolymers of the monomers forming the second shell (c) are generally formed to a certain extent in addition to the graft polymer. The quantity of this ungrafted polymer may be characterized by the degree of grafting or the graft yield. It depends inter alia on the polymerization conditions, on the composition of the first shell (b), on the size of the particles to be grafted and on the quantity of grafted acrylate rubber.

In the context of the invention, "graft polymer" is the product (the mixture of graft polymer and free copolymer of the graft monomers) obtained by polymerization of vinyl monomers in the presence of the rubber latex.

The graft polymers thus produced may be worked up by known methods, for example by coagulation of the latices with electrolytes (salts, acids or mixtures thereof). They may then be purified and dried.

Vinyl chloride polymers A in the context of the invention are preferably polyvinyl chloride, copolymers of vinyl chloride with up to 50% by weight copolymerizable compounds, preferably with up to 20% by weight copolymerizable compounds, and graft polymers of vinyl chloride on ethylene-vinyl acetate copolymers (preferably with vinyl acetate contents of ≦50% by weight).

Compounds copolymerizable with vinyl chloride are, for example, vinyl esters containing 1 to 8 C atoms in the alkyl radical of the carboxylic acid, vinyl ethers containing 3 to 7 C atoms, maleic anhydride, semiesters and diesters of maleic acid with aliphatic alcohols containing 1 to 8 C atoms in the alcohol part.

The vinyl chloride polymers suitable for use in accordance with the invention may be produced by known methods, for example by emulsion, suspension or bulk polymerization.

The molding compounds according to the invention may be produced by known methods of compounding, for example by mixing the PVC with the graft polymer in kneaders, screw, rolls, etc.

The molding compounds according to the invention may be processed to moldings by any of the methods normally used for processing polyvinyl chloride, including for example injection molding, extrusion, blow molding, thermoforming, calendering.

The molding compounds according to the invention may be blended with known PVC plasticizers, lubricants, pigments and processed as thermoplastics. They may be blended with other thermoplastic vinyl monomer resins, for example with SAN, PMMA, α-methylstyrene copolymer resins, with rubbers, such as chlorinated polyethylene or NBR, etc.

The graft rubber particle sizes are $d_{50}$ values (as determined by ultracentrifuge measurement in accordance with W. Scholtan, H. Lange, Kolloid Z. und Z. Polymere 250 (1972) 783-796).

EXAMPLES

1. PREPARATION OF A SILICONE EMULSION 1.1.38.4 Parts by weight octamethyl cyclotetrasiloxane, 1.2 parts by weight tetramethyl tetravinyl cyclotetrasiloxane and 0.2 part by weight tetraethoxysilane are stirred together. 0.5 Part by weight dodecylbenzenesulfonic acid is then added, followed by the addition of 70 parts by weight water over a period of 1 hour with intensive stirring. The pre-emulsion is homogenized twice at 200 bar in a high-pressure emulsifying machine. Another 0.5 part by weight dodecylbenzenesulfonic acid is added. The emulsion is stirred for 2 h at 850 C and then for 36 h at room temperature. It is neutralized with 5 N NaOH. A stable emulsion having a solids content of approximately 36% is obtained. The polymer has a gel content of 82% by weight, as measured in toluene.

2. PREPARATION OF AN ACRYLATE-RUBBER-DOPED SILICONE RUBBER 2.1.2500 Parts by weight of the latex 1.1.) and 228 parts by weight water are introduced into a reactor. A solution of 3 parts by weight potassium peroxydisulfate in 100 parts by weight water is then introduced into the reactor at 70° C. The following solutions are then introduced into the reactor over a period of 5 hours at 70° C.:
Solution 1:
  387 parts by weight n-butylacrylate
  4 parts by weight triallyl cyanurate
Solution 2:
  500 parts by weight water
  10 parts by weight Na salt of $C_{14-18}$ alkylsulfonic acids Polymerization is then completed over a period of 4 hours at 70° C. The latex formed contains the polymer in a concentration of 35% by weight. The polymer has a gel content of 92% by weight, as measured in toluene, and consists of 70% by weight silicone rubber and 30% by weight acrylate rubber. The latex has an average particle size ($d_{50}$) of 0.25 μm.

3. GRAFT POLYMERS ACCORDING TO THE INVENTION

3700 Parts by weight latex 2.1.) and 200 parts by weight water are introduced into a reactor. After initiation with a solution of 3.0 parts by weight potassium peroxy disulfate in 150 parts by weight water at 70° C., the following solutions are uniformly introduced into the reactor over a period of 4 hours:
Solution 1:
  555 parts by weight monomer
Solution 2:
  800 parts by weight water,
  15 parts by weight Na salt of $C_{14-18}$ alkylsulfonic acids.

Polymerization is then completed over a period of 4 hours at 70° to 75° C. Latices having solids contents of approximately 34% by weight are obtained.

The following products were prepared:

| Product | Monomer (parts by weight |
|---------|--------------------------|
| 3.1 | 400 styrene |
|  | 155 acrylonitrile |
| 3.2 | 500 methylmethacrylate |
|  | 50 n-butylacrylate |

4. COMPARISON GRAFT POLYMERS 4.1. An acrylate graft rubber consisting of 30 parts by weight of a graft-polymerized mixture of 90% by weight methylmethacrylate and 10% by weight n-butylacrylate on 70 parts by weight of a crosslinked alkylacrylate rubber base having an average particle size of 0.22 μm ($d_{50}$ value). Polymers such as these are known.

4.2. A commercial PVC modifier based on acrylate rubber (Acryloid KM 334 ®, a product of Rohm & Haas).

4.3. Example 3.1 is repeated leaving out the components from 2.1 (components (b)):

3600 Parts by weight latex 1.1.and 200 parts by weight water are introduced into a reactor. After initiation with a solution of 3.0 parts by weight potassium peroxy disulfate in 150 parts by weight water at 70° C., the following solutions are uniformly introduced into the reactor over a period of 4 hours:
Solution 1:
  400 parts by weight styrene
  155 parts by weight acrylonitrile
Solution 2:
  800 parts by weight water
  15 parts by weight Na salt of $C_{14-18}$ alkylsulfonic acids Polymerization is then completed over a period of 4 hours at 70° C. to 75° C. A latex having solids contents of approximately 34% by weight is obtained.

5. The graft polymers 3.1., 3.2.and 4.3.are isolated by coagulation of the graft polymer emulsions with $MgSO_4$. solution at a temperature in the range from 70° to 95° C., filtration, washing with water and drying to form a powder.

6. PROPERTIES OF THE MOLDING COMPOUNDS

To produce the molding compounds described in Table 1, polyvinyl chloride (K value 70) was combined with different quantities of various products. In each case, 2% by weight Ba/Cd laurate (solid) and 0.2% by weight ester wax have to be added as stabilizer and lubricant, respectively. The molding compounds are homogenized for 10 minutes at 180° C. on mixing rolls and molded into test specimens at 190° C.

TABLE 1

Properties of the molding compounds

| No. | PVC parts by weight | Graft polymer parts by weight | Ball indentation hardness MPA, 30" DIN 53 456 | Notched impact strength (kJ/m$^2$) DIN 53,543 | | |
|---|---|---|---|---|---|---|
| | | | | RT | −20° C. | −40° C. |
| 6.1 | 94 | 6 (3.1) | 114 | 10 | 7 | 6 |
| 6.2 | 94 | 6 (3.2) | 110 | 11 | 8 | 6 |
| 6.3 | 94+) | 6 (4.1) | 105 | 8 | 3 | 3 |
| 6.4 | 94+) | 6 (4.2) | 103 | 9 | 4 | 3 |
| 6.5 | 94+) | 6 (4.3) | 102 | 4 | 3 | 2 |
| 6.6 | 92 | 8 (3.1) | 102 | 13 | 9 | 8 |
| 6.7 | 92 | 8 (3.2) | 99 | 13 | 9 | 8 |
| 6.8 | 92+) | 8 (4.1) | 96 | 12 | 3 | 3 |
| 6.9 | 92+) | 8 (4.2) | 97 | 12 | 4 | 3 |
| 6.10 | 92+) | 8 (4.3) | 98 | 5 | 3 | 2 |
| 6.11 | 90 | 10 (3.1) | 114 | 37 | 11 | 9 |
| 6.12 | 90 | 10 (3.2) | 98 | 38 | 10 | 8 |
| 6.13 | 90+) | 10 (4.1) | 95 | 36 | 4 | 3 |
| 6.14 | 90+) | 10 (4.2) | 96 | 37 | 5 | 3 |
| 6.15 | 90+) | 10 (4.3) | 97 | 18 | 4 | 3 |

+)Comparison Examples

We claim:

1. Thermoplastic molding compounds of polyvinyl chloride and a particulate graft polymer, the particulate graft polymer comprising:
   (a) a core of a crosslinked silicon rubber containing units corresponding to the formula $R_2SiO$, and optionally units corresponding to one or more of the formulae $RSiO_{3/2}$, $R_3SiO_{\frac{1}{2}}$ or $SiO_2$, wherein R represents a monofunctional organic radical containing b 1-18 carbon atoms;
   (b) a first, inner, shell of crosslinked acrylate rubber; and
   (c) a second, outer, shell of a polymer or copolymer of resin-forming α, β-unsaturated radically polymerizable monomers.

2. Thermoplastic molding compounds as claimed in claim 1 in which the ratio by weight of (a) to (b) is from 90:10 to 40:60.

3. Thermoplastic molding compounds as claimed in claim 1 wherein the inner shell is crosslinked alkylacrylate.

4. Thermoplastic molding compounds as claimed in claim 1 wherein the resin-forming α, β-unsaturated radically polymerizable monomers are selected from α-methylstyrene, styrene, ρ-methylstyrene, halostyrene, acrylonitrile, methacrylonitrile, alkylmethacrylates containing 1-8 carbon atoms in the alcohol part, maleic acid derivatives, vinyl acetate, vinyl chloride and vinylidene fluoride.

* * * * *